(12) United States Patent
Lindquist et al.

(10) Patent No.: US 12,331,143 B2
(45) Date of Patent: Jun. 17, 2025

(54) CORROSION-RESISTANT PRIMER AND TOPCOAT COMPOSITION

(71) Applicant: SWIMC LLC, Cleveland, OH (US)

(72) Inventors: Jason Lindquist, Lino Lake, MN (US); Jason Ness, Woodbury, MN (US); Josh Hewuse, Eagan, MN (US); Garry Edgington, Fridley, MN (US); Tapan Debroy, Victoria, MN (US); James Gallagher, Minneapolis, MN (US)

(73) Assignee: SWIMC LLC, Cleveland, OH (US)

( * ) Notice: Subject to any disclaimer, the term of this patent is extended or adjusted under 35 U.S.C. 154(b) by 956 days.

(21) Appl. No.: 17/053,104

(22) PCT Filed: May 7, 2019

(86) PCT No.: PCT/US2019/031069
§ 371 (c)(1),
(2) Date: Nov. 5, 2020

(87) PCT Pub. No.: WO2019/217384
PCT Pub. Date: Nov. 14, 2019

(65) Prior Publication Data
US 2021/0139624 A1    May 13, 2021

Related U.S. Application Data

(60) Provisional application No. 62/667,668, filed on May 7, 2018.

(51) Int. Cl.
*C08F 222/10* (2006.01)
*B05D 7/00* (2006.01)
(Continued)

(52) U.S. Cl.
CPC .......... *C08F 222/1025* (2020.02); *B05D 7/54* (2013.01); *C09D 5/002* (2013.01);
(Continued)

(58) Field of Classification Search
CPC ........ C09D 163/00; C09D 5/002; C09D 5/08; C08F 222/1025; B05D 2202/00
See application file for complete search history.

(56) References Cited

U.S. PATENT DOCUMENTS

| 4,602,061 A | 7/1986 | Akkerman |
| 5,132,367 A | 7/1992 | Chan |

(Continued)

FOREIGN PATENT DOCUMENTS

| CN | 1034734 A | 8/1989 |
| EP | 0326723 B1 | 3/1993 |

(Continued)

OTHER PUBLICATIONS

Sartomer Emea; "Technical Data Sheet—CN112C60 Novolac Epoxy Acrylate Oligomer diluted with 40% of TMPTA"; https://emea.sartomer.com/en/product-finders/product/f/sartomer_Epoxy_EMEA/p/cn112c60/.

(Continued)

*Primary Examiner* — Kregg T Brooks
*Assistant Examiner* — David R. Foss
(74) *Attorney, Agent, or Firm* — Honigman LLP (57) ABSTRACT

Compositions and methods involving latent base-catalyzed Michael addition reaction are described herein. The compositions described herein are derived from a Michael addition reaction and provide coatings, including primer coatings and direct-to-metal coatings that have optimal adhesion, corrosion resistance, and cure response when applied to a substrate and cured.

27 Claims, 1 Drawing Sheet (51) Int. Cl.
  *C09D 5/00* (2006.01)
  *C09D 5/08* (2006.01)
  *C09D 163/00* (2006.01)
  *C09D 175/04* (2006.01)

(52) U.S. Cl.
  CPC ............. *C09D 5/08* (2013.01); *C09D 163/00* (2013.01); *C09D 175/04* (2013.01); *B05D 2202/00* (2013.01)

(56) References Cited

U.S. PATENT DOCUMENTS

| | | |
|---|---|---|
| 5,288,802 A | 2/1994 | Walters et al. |
| 5,332,785 A | 7/1994 | Brindoepke |
| 5,350,875 A | 9/1994 | Kumar et al. |
| 5,567,761 A | 10/1996 | Song |
| 6,740,359 B2 | 5/2004 | Kumar et al. |
| 7,396,429 B2 | 7/2008 | Beckley et al. |
| 8,962,725 B2 | 2/2015 | Brinkhuis et al. |
| 9,328,274 B2 | 5/2016 | Keledjian et al. |
| 2006/0078742 A1 | 4/2006 | Kauffman et al. |
| 2018/0094143 A1 | 4/2018 | Wehner et al. |
| 2018/0100069 A1 | 4/2018 | Wehner et al. |
| 2018/0112098 A1 | 4/2018 | Wehner et al. |
| 2020/0095452 A1 | 3/2020 | Tye |

FOREIGN PATENT DOCUMENTS

| | | |
|---|---|---|
| EP | 3085748 A1 | 10/2016 |
| EP | 3085749 A1 | 10/2016 |
| WO | 9516749 A1 | 6/1995 |
| WO | WO-2005037935 A2 * | 4/2005 ............ C08F 289/00 |
| WO | 2008130894 A1 | 10/2008 |
| WO | 2011124663 A1 | 10/2011 |
| WO | 2014166880 A1 | 10/2014 |
| WO | 2016016637 A1 | 2/2016 |
| WO | 2016166369 A1 | 10/2016 |
| WO | 2016169543 A1 | 10/2016 |
| WO | 2016169544 A1 | 10/2016 |
| WO | 2016169545 A1 | 10/2016 |
| WO | WO-2018022810 A1 * | 2/2018 ............... B05D 7/50 |
| WO | 2018187430 A1 | 10/2018 |
| WO | 2019217384 A1 | 11/2019 |

OTHER PUBLICATIONS

Brinkhuis, et al. "Taming the Michael Addition Reaction" European Coatings Journal, May 2015, 7 pages.

International Search Report and Written Opinion of the International Searching Authority, PCT/US2019/031069, Jul. 21, 2019, (12 pages).

International Search Report; Mailed Jul. 19, 2019 for PCT Application No. PCT/US2019/031069.

ACURE™ 510-170 Technical Datasheet, "A malonate functional polyester resin with a CH equivalent weight of 212 g/eq (calculated on as-supplied product), for use as a donor resin in ACURE systems. Contains 1.5 +/− 0.05 % succinimide", ® 2020 allnex group, 1 page.

European Office Action issued in Application No. 19 799 329.8 dated Jan. 23, 2023, 9 pages.

Shen et al., "Modified epoxy acrylate resin for photocurable temporary protective coatings", Elsevier, Progress in Organic Coatings, 2015, 9 pages.

* cited by examiner

CORROSION-RESISTANT PRIMER AND TOPCOAT COMPOSITION

CROSS REFERENCE TO RELATED APPLICATIONS

This application is a National Stage filing under 35 U.S.C. 371 of International Application No. PCT/US2019/031069 filed on May 7, 2019, which claims the benefit of U.S. Provisional Application No. 62/667,668 filed on May 7, 2018, each of which is incorporated herein by reference in its entirety.

BACKGROUND

Coatings are frequently applied to various substrates, including metal and steel substrates to prevent corrosion. These coatings are often multilayer coatings, featuring one or more primer coats with topcoats applied thereon. These coatings are economical and relatively easy to apply. The coatings dry quickly and have good corrosion resistance and chemical resistance, making the coatings especially useful for coating metal components to be used over long periods of time and/or in corrosive environments.

Conventionally, primer coatings are applied to metal surfaces to provide corrosion protection. These primers are typically epoxy resins, polyurethane resins, and the like. Typically, such coating systems are crosslinkable two-component compositions, where the components are stored separately and mixed prior to use. The two components are highly reactive and will begin to crosslink as soon as they are mixed. It is conventional to include a catalyst in such primer coating systems to increase the rate of the crosslinking reaction between the two components.

The crosslinking reaction may be base-catalyzed or acid-catalyzed. Base-catalyzed systems are sometimes preferred because they are capable or rapid or fast cure. However, because of the rapid rate of cure, these compositions can only be used for a relatively short period of time after the components are mixed, defined as the potlife of the coating composition. In some base-catalyzed systems, viscosity increases so rapidly that the coating cures before it can be fully applied to a surface, and accordingly, these systems are of limited practical use.

Due to regulatory concerns regarding the use of volatile organic compounds (VOC) in solvent-borne coatings, high solids systems with low solvent content are preferred. However, high solids systems present several challenges with regard to balancing potlife and cure speed. For example, a high solids composition typically includes less solvent that can evaporate when the coating is applied, and as a result, the potlife is much lower than preferred. On the other hand, the increase in reaction rate when the coating is applied is also reduced with less solvent in the system, leading to slower cure. A combination of rapid cure and long potlife is therefore difficult to achieve for conventional high solids coating systems.

One possible solution to the problem of reduced potlife in base-catalyzed systems is the use of a latent catalyst. These catalysts are activated only after the coating is applied, and provide longer potlife without compromising cure speed. For example, the use of substituted carbonate salts as latent catalysts for a base-catalyzed system is described in U.S. Pat. No. 8,962,725, incorporated herein by reference.

However, it is not known whether coating compositions that use such latent catalyst systems may be used as primer compositions. To be useful as a primer composition, a coating composition must demonstrate optimal adhesion to the substrate and optimal corrosion resistance. The one-coat system described in U.S. Pat. No. 8,962,725 is not known to offer sufficient corrosion resistance when applied directly to a metal substrate. Moreover, when some currently known base-catalyzed compositions are applied directly to metal substrates, particularly acidic or acid-treated substrates, a loss of cure and/or adhesion is observed.

Accordingly, there is a need for primer systems that demonstrate optimal adhesion and corrosion resistance, while taking advantage of the rapid cure speed and optimal potlife demonstrated by latent base-catalyzed systems that crosslink via Michael addition reactions to produce a superior coating composition.

SUMMARY

The present description provides compositions and methods involving a Michael addition reaction. The compositions described herein are derived from a Michael addition reaction and provide coatings that have optimal adhesion, corrosion resistance, and cure-response when applied to a substrate and cured.

In one embodiment, the present description provides a coating composition including at least one resin. The resin composition includes at least one Michael addition acceptor having at least one Michael addition acceptor functional group. At least a portion of the Michael addition acceptor includes an epoxy backbone. The resin composition also includes a Michael addition donor having at least one Michael addition donor functional group. At least a portion of the Michael addition donor includes an epoxy backbone. In an aspect, at least a portion of the total resin composition, i.e. from less than 1% to 100%, includes an epoxy backbone, which may be derived from the Michael addition acceptor, the Michael addition donor, or a combination of the Michael addition acceptor and Michael addition donor.

The coating composition further includes a latent base catalyst and optionally, at least one acid scavenging component, and at least one adhesion promoter component. The coating composition is capable of cure in about 1 to 10 minutes at 150° F., and the cured coating formed from the composition is corrosion-resistant.

In another embodiment, the present description provides a coating composition including at least one resin. The resin includes both Michael addition acceptor and Michael addition donor functional groups. At least a portion of the Michael addition acceptor/donor includes an epoxy backbone. The coating composition further includes a latent base catalyst. The coating composition is capable of cure in about 1 to 10 minutes at 150° F., and the cured coating formed from the composition is corrosion-resistant.

In yet another embodiment, the present description provides a method of making a corrosion-resistant primer coating. The method includes steps of providing a substrate, and applying on the substrate a coating composition that includes a resin composition. The resin composition includes at least one Michael addition acceptor and at least one Michael addition donor. The Michael addition acceptor, Michael addition donor, or both may include an epoxy backbone, such that at least a portion of the total resin composition, i.e. from less than 1% to 100%, includes an epoxy backbone. The composition further includes a latent catalyst. After the coating composition is applied, the coating composition is cured in a maximum of about 12 hours at ambient temperatures to obtain a corrosion-resistant coating with a minimum pencil hardness of H. If allowed to cure at higher temperatures, such as, for example, at about 120° F. to 170° F., preferably about 150° F., the coating composition may be cured in as little as 30 seconds to 15 minutes, preferably 1 to 10 minutes to obtain a corrosion-resistant coating with a minimum pencil hardness of H.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

SELECTED DEFINITIONS

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "component" refers to any compound that includes a particular feature or structure. Examples of components include compounds, monomers, oligomers, polymers, and organic groups contained there.

The term "double bond" is non-limiting and refers to any type of double bond between any suitable atoms (e.g., C, O, N, etc.).

The term "triple bond" is non-limiting and refers to any type of triple bond between any suitable atoms.

"Michael addition," as used herein refers to the nucleophilic addition of a carbanion or other nucleophile to an electron-deficient ethylenically unsaturated compound, such as an α,β-unsaturated carbonyl compound, for example. The abbreviated form "MA" is used interchangeably herein with the term "Michael addition."

A Michael addition reaction follows the general reaction schematic shown here:

In the reaction schematic shown above, B is a latent base catalyst that reacts with the Michael addition (MA) donor by deprotonation to form a carbanion for a subsequent addition reaction with the MA acceptor.

The term "resin composition," as used herein refers to the resin-containing portion of the composition. The resin composition may include one or more resins. Suitable examples include, without limitation, MA donors, MA acceptors, non-functional resins, and resins with functionality other than those required Michael addition.

By "Michael addition acceptor" or "MA acceptor" is meant a molecule having at least one MA acceptor functional group By "Michael addition donor" or "MA donor" is meant a molecule having at least one MA donor functional group.

The term "epoxy backbone" as used herein refers to that portion of a resin that is derived from an epoxy resin. If derived from an epoxy resin, the epoxy backbone may be derived from either aromatic or aliphatic epoxy resins. Suitable examples of aromatic epoxy resins are known to those skilled in the art and include, without limitation, epoxy resins derived from bisphenol A (BPA), BPF, novolac, or cresol. Furthermore, after modification, epoxy functional groups may no longer be part of the epoxy backbone.

As used herein, the term "epoxy MA acceptor" refers to an MA acceptor as defined herein that includes an epoxy backbone.

The term "non-epoxy MA acceptor" as used herein refers to an MA acceptor as defined herein that does not include an epoxy backbone.

As used herein, the term "epoxy MA donor" means an MA donor as defined herein that includes an epoxy backbone.

As used herein, the term "non-epoxy MA donor" means an MA donor as defined herein that does not include an epoxy backbone.

By "MA acceptor/donor" is meant a molecule having at least one Michael addition (MA) acceptor functional group and at least one Michael addition (MA) donor functional group.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

The term "dispersion" in the context of a dispersible polymer refers to the mixture of a dispersible polymer and a carrier. The term "dispersion" is intended to include the term "solution."

The term "ambient temperature," as used herein refers to the surrounding temperature in a typical indoor or room temperature environment, i.e. a temperature of about 68° F. to 77° F. (20° C. to 25° C.).

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description provides methods and compositions for corrosion-resistant coatings for a variety of substrates including metal substrates and steel substrates. Specifically, the present description provides corrosion-resistant primers for untreated or pretreated steel substrates, where the primers are derived from components that cure via a Michael addition reaction.

In an embodiment, the present description provides a coating composition. The composition includes at least one MA donor, i.e. a molecule having at least one MA donor functional group.

Suitable examples of MA donors include, without limitation, dialkyl malonates (e.g., dimethyl malonate, diethyl malonate, and the like), cyanoacetates (e.g., methyl cyanoacetate, ethyl cyanoacetate, and the like), chloroacetates, acetoacetates, propionyl acetates, malononitrile, acetonitrile, acetylacetone, dipropionyl methane, and the like, and mixtures or combinations thereof. Preferred examples of MA donors include, without limitation, malonate or acetoacetate group containing oligomeric and polymeric compounds such as, for example, polyesters, polyurethanes, polyacrylates, epoxy resins, polyamides, and polyvinyl resins containing malonate or acetoacetate functional groups in the main chain, pendant, or both.

In an embodiment, the MA donor described herein is at least one polymeric resin having Michael addition donor functional groups. In an aspect, the backbone of the MA donor includes epoxy backbone. In a preferred aspect, the epoxy backbone of the MA donors is aromatic. Suitable aromatic epoxy resins that can be functionalized to act as MA donors include, without limitation, bisphenol A epoxy and novolac epoxy resins. In an aspect, the epoxy resins can be functionalized by reaction with diketene, transesterification with an alkyl acetoacetate or dialkyl malonate, esterification of the epoxy resin with malonic acid or a monoester or acid functional malonated polyester, and the like.

In an embodiment, the MA donor described herein is a resin that includes an aromatic epoxy backbone that has been functionalized with Michael addition donor groups.

In an embodiment, the present description provides a coating composition. The composition includes at least one MA acceptor, i.e. a molecule having at least one MA donor functional group.

Suitable examples of MA acceptors include, without limitation, esters of (meth)acrylic acid, i.e. a (meth)acrylate functional compound derived from the reaction of an hydroxyl functional compound (i) with (meth)acrylic acid or its ester derivatives (ii), wherein the hydroxyl functional compound can be mono-, di-, or polyfunctional and has as a backbone that contains an aliphatic, cycloaliphatic or aromatic chain, a (poly)epoxy, (poly)ether, (poly)ester for example (poly)caprolactone, (poly)alkyd, (poly)urethane, (poly)amine; (poly)amide, (poly)carbonate, (poly)olefin, (poly)siloxane, (poly)acrylate, halogen (e.g. fluorine), a melamine-derivative, copolymers of any of them, and the like, and mixtures and combinations thereof.

Suitable examples of acids that can be used to functionalize the aromatic epoxy backbone include, without limitation, acrylic acid, methacrylic acid, and the like.

Preferred examples of such MA acceptors include, without limitation, the multifunctional acrylate derivatives of glycidyl epoxy resins (e.g., diglycidyl ether of bisphenol A) and phenolic novolac epoxy resins. In a particularly preferred aspect, the MA acceptor described herein is an aromatic epoxy acrylate.

In an embodiment, the MA acceptor described herein may be at least one polymeric resin having Michael addition acceptor functional groups. In an aspect, the MA acceptor is a resin with an aromatic epoxy backbone functionalized by reaction with one or more MA acceptor functional groups.

In an embodiment, the MA acceptor described herein is a resin that includes an aromatic epoxy backbone having Michael addition acceptor functional groups. In an aspect, the MA acceptor is multifunctional, i.e. the MA acceptor has a functionality of preferably 2 or more.

Suitable examples of MA acceptors with aromatic epoxy backbone include, without limitation, acrylated glycidyl epoxy resins (e.g., diglycidyl ether of bisphenol A (BPA)), and acrylated novolac epoxy resins. In a preferred aspect, the MA acceptor described herein is a difunctional BPA epoxy acrylate.

In an embodiment, the resin composition may include one or more epoxy MA-functionalized components and one or more non-epoxy MA-functionalized components. In an aspect, the backbone of the resin composition includes preferably near 100%, more preferably 100% epoxy backbone. In another aspect, the backbone of the resin composition may include less than 100% epoxy backbone.

Suitable examples of non-epoxy MA acceptors include, without limitation, various (meth)acrylate esters of unsubstituted or substituted $C_1$-$C_{15}$ alcohols such as, for example, tripropylene glycol, isobornyl alcohol, isodecyl alcohol, phenoxyethyl alcohol, trishydroxyethyl isocyanurate, trimethylolpropane, ditrimethylolpropane ethoxylate (diTMPTA), hexanediol, ethoxylated neopentyl glycol, propoxylated neopentyl glycol, ethoxylated phenol, polyethylene glycol, trimethylolpropane, propoxylated glycerol, pentaerythritol, tetrahydrofurfuryl alcohol, β-carboxyethyl alcohol, or combinations thereof. For example, the olefinic monomer may be isobornyl(meth)acrylate, isodecyl(meth)acrylate, phenoxyethyl(meth)acrylate, trimethylolpropane tri(meth)acrylate, alkoxylated cyclohexane dimethanol di(meth)acrylate, trimethylolpropane ethoxylate tri(meth)acrylate, dipropylene glycol di(meth)acrylate, tripropylene glycol di(meth)acrylate, hexanediol di(meth)acrylate, tetrahydrofurfuryl (meth)acrylate, pentaerythritol tri(meth)acrylate, pentaerythritol tetra(meth)acrylate, di-pentaerythritol penta(meth)acrylate, di-pentaerythritol hexa(meth)acrylate, di-(trimethylolpropane tetra(meth)acrylate), propoxylated glycerol tri(meth)acrylate, beta-carboxyethyl(meth)acrylate, ethoxylated neopentyl glycol di(meth)acrylate, propoxylated neopentyl glycol di(meth)acrylate, di-(trimethylolpropane tetra(meth)acrylate) or combinations thereof. In a preferred aspect, the non-epoxy acrylate MA acceptor is ditrimethylolpropane tetraacrylate (DTMPTA).

In an aspect, the one or more non-epoxy acrylate MA acceptors have a functionality of preferably at least 2 or more.

Without limiting to theory, it is believed that a multifunctional MA donor and a multifunctional MA acceptor will react via a Michael addition reaction, and thereby help improve cure speed, crosslink density, and hardness development for the coating compositions described herein. The improved cured and increased crosslink density will lead to improved performance characteristics.

In an embodiment, the MA donor and the MA acceptor are mixed together to obtain a coating composition. In an aspect, the MA donor and MA acceptor will each independently be present in an amount of about 5 to 50 percent by weight, preferably 10 to 40 percent by weight, based on the total weight of the coating composition. In an aspect, stoichiometric index of MA donor acidic protons to MA acceptor unsaturated groups is 10:1 to 0.1:1, preferably 5:1 to 0.2:1, more preferably 1.5:1 to 0.7:1.

In an embodiment, the coating composition described herein is a crosslinkable composition made by a Michael addition reaction between one or more MA donors and one or more MA acceptors. The Michael addition reaction is catalyzed by a crosslinking catalyst. In an aspect, the crosslinking catalyst is a latent base catalyst.

In an embodiment, the latent base catalyst described herein is a substituted carbonate salt having the structure of a compound of formula (I):

(I)

In Formula (I):

$X^+$ is a non-acidic cation. Suitable examples include, without limitation, alkali metal ion, alkali-earth metal ion, ammonium ion, phosphonium ion, and the like. In a preferred aspect, $X^+$ is a lithium, sodium, or potassium ion, and the like. More preferably, $X^+$ is a quaternary ammonium ion $NR'_4$ or a phosphonium ion $PR'_4$, wherein R is H, unsubstituted C1-C10 alkyl, aryl, aralkyl, substituted C1-C10 alkyl, aryl, aralkyl, and mixtures or combinations thereof. In a preferred aspect, R is an unsubstituted alkyl group having 1 to 4 carbon atoms. If the R group is substituted, the substituents are selected so as to not substantially interfere with the crosslinking reaction. In an aspect, to avoid interference with the action of the base catalyst, acidic substituents, such as for example, carboxylic acid substituents are present in only insubstantial amounts, or absent altogether.

In an embodiment, the latent base catalyst described herein is a compound with the general structure shown in Formula (I), wherein the cation $X^+$ is linked with the carbonate group of Formula (I) in a single molecule, i.e. the latent base catalyst has the general structure shown in Formula (II):

(II)

In another embodiment, the latent base catalyst described herein is a compound of the general structure shown in Formula (I), wherein the group R is a polymer, and/or the cation X+ is a quaternary ammonium ion NR'$_4$ or a phosphonium ion PR'$_4$, wherein at least one R' is a polymer.

In a preferred embodiment, the latent base catalyst described herein is a compound with the general structure shown in Formula (I), preferably a quaternary alkyl ammonium carbonate. Suitable examples include, without limitation, tetrahexylammonium methyl carbonate, tetradecyl—(i.e. C14)—trihexylammonium-methyl carbonate and tetradecylammonium methyl carbonate, tetrabutylammonium methylcarbonate, tetrabutylammonium ethyl carbonate, benzyltrimethylammonium methyl carbonate, or trihexylmethylammonium methyl carbonate or trioctylmethylammonium methyl carbonate, and mixtures or combinations thereof. In a preferred aspect, the latent base catalyst described herein include tetrabutylammonium alkylcarbonate.

In an embodiment, the amount of latent base catalyst used herein may vary depending on the properties of the coating composition. Preferably, the composition includes about 0.001 to 1 meq catalyst per gram of resin solids, more preferably 0.02 to 0.07 meq per gram of resin solids. Latent catalysts of this type are known in the art. For example, a commercially available version of the latent catalyst described herein is called A-CURE 500 (Allnex, Frankfurt, Germany).

Without limiting to theory, it is believed that the latent base catalyst of Formula (I) functions by releasing carbon dioxide when the carbonate salt decomposes. This produces a strong base, i.e. a hydroxide, an alkoxy, or an aralkyloxy base. In a closed pot, this reaction takes place slowly, allowing for extended pot life. When the coating is applied and surface area increases, the base is regenerated quickly as carbon dioxide escapes from the surface, allowing for faster cure (i.e. drying and hardness development) of the coating. Accordingly, the use of a latent base catalyst of Formula (I) allows for optimal potlife, open time, and cure performance for the crosslinkable coating compositions described herein.

In an embodiment, a non-latent base catalyst may be used alone or in combination with the latent base catalyst described herein to accelerate the Michael addition reaction. Examples of suitable non-latent catalysts include, without limitation, tetrabutyl ammonium hydroxide, ammonium hydroxide, DBU (8-Diazabicyclo[5.4.0]undec-7-ene), DBN (1,5-Diazabicyclo[4.3.0]non-5-ene), and TMG (1,1,3,3-tetramethylguanidine).

Suitable additional examples of non-latent catalysts include, without limitation, salts of non-acidic cations such as K$^+$, Na$^+$, Li$^+$, or weakly acidic cations such as, for example, protonated species of strong organic bases such as, for example, DBU, DBN, and the like, or TMG and the like, paired with a basic anion X$^-$ from an acidic X—H group-containing compound, where X is N, P, O, S or C, and the anion X$^-$ is an MA donor capable of reaction with the MA acceptor (e.g. acrylate), and the anion X$^-$ has a pKa of the corresponding acid X—H that is more than two units lower than the pKa of the majority donor component (e.g. acetoacetate-functional resin). Suitable examples of such salts include, without limitation, salts formed from the reaction of KOH and benzotriazole, TBAH and benzotriazole, or KOH and 1,2,4-triazole, included at a level between 0.001 and 1 meq/gram solid resin. Mixtures or combinations of the above may be used. The preferred non-latent catalyst is a solution of potassium benzotriazolide formed from the reaction of KOH and benzotriazole at an equal molar ratio in ethanol.

Optionally, to extend open-time and potlife, one or more additional components may be included, such as, for example. one or more acidic X'—H groups, where X' is N, P, O, S, or C, where the X' anion is a MA donor capable of reaction with the MA acceptor, and the pKa of the X'—H group is lower than the pKa of the majority MA donor (e.g. acetoacetate-functional resin), preferably more than 2 units lower. Suitable examples include, without limitation, ethylacetoacetate, benzotriazole, succinimide, acetyl acetone, or 1,2,4-triazolem, and mixtures or combinations thereof. In a preferred aspect, the component is benzotriazole, present in an amount of between about 0.5 and 5%, more preferably between about 0.5% and 1.5%, based on the total weight of resin solids.

In an embodiment, the coating composition described herein includes an acid-scavenging or pH-buffering component. Suitable examples include, without limitation, metal oxide (e.g., zinc oxide, nanoparticular zinc oxide, magnesium oxide, calcium oxide, strontium oxide, barium oxide, lanthanum oxide, ytterbium oxide, zirconium oxide, and the like), mixed metal oxide (e.g., MgO—TiO$_2$, and the like), zeolites (e.g., cesium-exchanged zeolite, X,Y-Cs-occluded zeolite, and the like), modified mesoporous materials (e.g., MgO-coated mesoporous silica (SBA-15), amino-functionalized mesoporous silica (MCM-41), mesoporous silicon oxynitride, and the like), metal hydroxide (e.g., calcium hydroxide, Na/NaOH/Al$_2$O$_3$, Na/MgO, and the like), metal nitride, metal oxynitride (e.g., silicon, oxynitride, aluminophosphate oxynitride, zirconophosphate oxynitride, calcined NaNO$_3$, and the like), metal carbonate (e.g., calcium carbonate, sodium carbonate, potassium carbonate, and the like), metal silicate (e.g., calcium silicate, calcium borosilicate, magnesium silicate, Mg—Al hydrotalcite, chrysotile, and the like), metal carboxylate salts (e.g., titanium acetylacetate, and the like), organic metal compounds (e.g., organic zirconate, weak base titanate, tetraalkyl titanate, and the like), amines (e.g., guanidine, aziridine, amidine, triethanolamine, DMP30, and the like), imides (e.g., carbodiimide, and the like), diaza-bicyclo compounds (e.g., DABCO, and the like), and mixtures or combinations thereof.

Accordingly, in an embodiment, the coating compositions described herein are applied over an acidic substrate, such as for example, a metal substrate with a pretreatment applied thereon. Suitable examples of pretreatment include, without limitation, iron phosphate, zinc phosphate, silane, zirconium, and the like. Many other pretreatments are known in the metal pretreatment industry. In a preferred aspect, the metal substrate has an iron phosphate treatment applied thereon.

In some embodiments, the coating compositions described herein optionally include one or more adhesion promoters. By "adhesion promoter" is meant an additive that is included in a coating composition to form primary bonds with either the substrate surface or with any previously applied coating or pretreatment. As used herein, the one or more adhesion promoters function to improve dry adhesion, wet adhesion, or preferably, both, of a primer composition to the substrate.

Suitable examples of adhesion promoters useful with the coating compositions described herein include, without limitation, silanes, silicones, catalytic metals, and the like. Of these, organosilane adhesion promoters or coupling agents are preferred.

In an embodiment, if present in the coating composition, the adhesion promoter is present in an amount of preferably 2 to 20, more preferably 5 to 15, and even more preferably 7 to 10 percent by weight, based on the total weight of resin solids in the coating composition.

The coating composition described herein may also include other optional ingredients that do not adversely affect the coating composition or a cured coating composition resulting therefrom. Such optional ingredients are typically included in a coating composition to enhance coating aesthetics; to facilitate manufacturing, processing, handling, and application of the composition; and to further improve a particular functional property of a coating composition or a cured coating composition resulting therefrom. For example, the composition described herein may optionally include fillers, catalysts, lubricants, pigments, surfactants, dyes, colorants, toners, coalescents, extenders, anticorrosion agents, flow control agents, thixotropic agents, dispersing agents, antioxidants, adhesion promoters, light stabilizers, and mixtures thereof, as required to provide the desired film properties. Each optional ingredient is preferably included in a sufficient amount to serve its intended purpose, but not in such an amount to adversely affect a coating composition or a cured coating composition resulting therefrom.

In an embodiment, the composition described herein may include resin components that do not undergo Michael addition reaction, in addition to the MA donors and MA acceptors described herein. These additional resin components may have no reactive functional groups or have reactive functional groups that undergo reactions other than the Michael addition reaction.

For example, in an aspect, the composition described herein may include a co-reactant, such as, without limitation, an amine co-reactant. The presence of such a co-reactant helps improve certain performance characteristics of the composition described herein, such as corrosion resistance. In an aspect, where the composition described herein is a two-part composition, the co-reactant may be included in the first part (part A) or in the second part (part B) of the composition. In a preferred aspect, the co-reactant is an amine co-reactant present in part B of the composition. If present, the amine co-reactant is present in an amount of about 0.01 to 1 percent by weight, preferably 0.05 to 0.1 percent by weight, based on the total weight of the resin solids.

In an embodiment, the coating composition described herein may include a solvent. Suitable solvents may be aqueous, organic, or mixtures thereof. Suitable examples of organic solvents include, without limitation, aliphatic solvents, aromatic and/or alkylated aromatic solvents (e.g., toluene, xylene, and the like), alcohols (e.g., isopropanol), esters (e.g., methoxy propanol acetate, butyl acetate, butyl acetate, and the like), ketones (e.g., methyl ethyl ketone, methyl amyl ketone, and the like), glycol ethers, glycyl ether esters, and mixtures or combinations thereof. In an aspect, the coating composition described herein has a low volatile organic compound (VOC) content, preferably less than 400 g/L, more preferably less than 300 g/L, and most preferably less than 250 g/L.

In an embodiment, the coating composition described herein may be used as a primer or may be part of a primer formulation. When used as a primer or in a primer formulation, the composition described herein may be applied over an untreated substrate, a pretreated substrate, a substrate with a temporary coating applied thereon, and the like. In a preferred aspect, the composition described herein is applied over a metal substrate with an acidic pretreatment, preferably a phosphate pretreatment.

In an embodiment, the coating composition described herein may be used as a topcoat. In an aspect, a first coating (such as a primer, for example) is applied over an untreated substrate, a pretreated substrate, a substrate with a temporary coating applied thereon, and the like. Then, a second coating (such as a topcoat, for example) is applied over the primer. In an aspect, the second coating is applied only after the first coating has fully dried or cured. In an alternative aspect, the second coating is applied over the first coating before the first coating has fully dried or cured. Where the coating composition is intended for exterior usage and/or intended to be a weatherable coating, for example as a topcoat or direct-to-metal (monocoat) application, it is preferred that the resin backbone of all MA acceptors and MA donors within the composition includes less than 100%, preferably less than 75%, and more preferably less than 50% epoxy backbone.

In an embodiment, the coating composition described herein may be used as a primer, and any topcoat may be applied over the described primer. In an aspect, the topcoat composition is also obtained by a Michael addition reaction. The Michael addition-derived topcoat may be the same or different than the Michael addition-derived primer composition described herein. In another aspect, the topcoat composition may be a component not derived by a Michael addition reaction, but known in the art as a suitable topcoat material, such as a polyurethane topcoat, for example. Michael addition-derived topcoats are known in the art, as described in U.S. Pat. No. 8,962,725, for example, incorporated herein by reference.

Conventionally, Michael addition-derived coating compositions have demonstrated improved cure response relative to traditional primers made with polyurethane, epoxy, non-isocyanate systems, and the like. However, use of such Michael addition-derived coatings has been limited due to poor adhesion to various substrates, and due to a lack of corrosion resistance, particularly when applied as a primer or as a direct-to-metal (DTM) coating on a metal substrate, particularly a pretreated steel substrate.

Surprisingly, and in contravention of industry bias and knowledge in the art, the Michael addition-derived coating compositions described herein demonstrate the expected improved cure response but also show optimal adhesion and corrosion resistance. Accordingly, these compositions may be used as primer compositions or direct-to-metal coatings applied to metal substrates or pretreated steel substrates.

The compositions described herein also show improved shelf life and potlife of relative to conventional coatings and knowledge of such coatings in art. In an aspect, the compositions described herein have optimal shelf-life and demonstrate no loss of cure-response or any viscosity increase after storage for at least one week at temperatures of about 120° F. In another aspect, the coating compositions described herein also demonstrate optimal potlife, where the composition takes preferably longer than 60 minutes, more preferably longer than 120 minutes, to double in viscosity after mixing.

The coating composition of the present invention may be applied to a substrate either prior to, or after, the substrate is formed into an article. In an aspect, the coating composition described herein may be applied on a variety of substrates. Suitable examples include, without limitation, natural and engineered buildings and building materials, freight containers, flooring materials, walls, furniture, other building materials, motor vehicles, motor vehicle components, aircraft components, trucks, rail cars and engines, bridges, water towers, cell phone tower, wind towers, radio towers, lighting fixtures, statues, billboard supports, fences, guard rails, tunnels, pipes, marine components, machinery components, laminates, equipment components, appliances, and packaging. Exemplary substrate materials include, without limitation, wood, plastics, thermosets, metals, metal alloys, intermetallic compositions, metal-containing composites, and combinations of these. Exemplary metal substrates include, without limitation, aluminum, steel, weathering steel, and stainless steel. In a preferred aspect, the substrate is steel, preferably steel with a pretreatment applied thereon.

The coating composition described herein may be applied by any method known in the art. Standard methods of application include, without limitation, such as by brushing, spraying, spin coating, roll coating, curtain coating, dipping, gravure coating, bell application, and/or the like. In the case of two-component thermoset substrates, the coating may be applied via in-mold processes. When the coating composition is applied by spray methods, both conventional air or air-assisted spray equipment, or airless spray equipment may be used. Both electrostatic and non-electrostatic equipment may be used.

The coating thickness of a particular layer and the overall coating system will vary depending upon the coating material used, the substrate, the coating application method, and the end use for the coated article. When used as a primer applied over an untreated or pretreated metal substrate, the thickness of the applied coating film is preferably about 0.05 to 20 mils (1.27 to 500 microns), more preferably 0.4 to 40 mil (10 to 100 micron), and even more preferably 1.0 to 2.5 mils (25 to 70 microns).

In an embodiment, the composition described herein provides a cured coating with optimal cure and corrosion resistance. In an aspect, after the coating is applied to a substrate, it is cured within 1 to 10 minutes at a bake temperature of 150 F, where the term "cured" means at least partially, preferably fully, crosslinked. As a measure of optimal cure, the cured coating demonstrates a pencil hardness of preferably least H, more preferably at least 2H, even more preferably at least 5H.

In an embodiment, the composition described herein provides a cured coating with optimal cure and corrosion resistance. In an aspect, the corrosion resistance of the cured coating is measured after exposure to salt fog for at least 500 hours. As a measure of corrosion resistance, the cured coating demonstrates creep from scribe of preferably less than about 3 mm, more preferably less than about 2 mm, and shows little to no rust or blistering on prolonged exposure to salt spray, cyclical corrosion tests or other accelerated corrosion tests commonly used in the industry.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight.

Test Methods

Unless indicated otherwise, the following test methods were utilized in the Examples that follow.

Corrosion Resistance (Salt Fog)

The corrosion resistance of cured coatings prepared from the composition described herein is tested using the salt fog method, as described in ASTM B117 (Standard Practice for Operating Salt Fog Apparatus). Results are expressed by degree of blistering (ASTM D714), rusting (ASTM D610) and creep from scribe (ASTM D1654-08). Creep from scribe is expressed on a scale of 0 to 10, where 0 indicates extensive corrosion at the scribe, and 10 indicates the coating is unchanged from exposure to the corrosive environment. Rust ratings for coatings subjected to salt fog exposure in a humid environment are also expressed on a scale of 0 to 10 where 0 indicates complete surface rust, and 10 indicates no surface rust according to ASTM D610. Blister ratings are expressed on a scale of 0 to 10 where 0 is excessive blistering and 10 is no blistering according ASTM D714.

Corrosion Resistance (Creep)

The corrosion resistance of cured coatings prepared from the composition described herein is also tested by measuring creep after exposure to a corrosive environment, as described in ASTM D 1654-08 (Standard Test Method for Evaluation of Painted or Coated Specimens Subjected to Corrosive Environments). A coating is applied to a panel and cured. The panel is then scribed to metal and exposed to salt fog for a given period of time. Paint loss from the scribe is measured, and results are expressed as the amount of creep (in mm) from the scribe. For commercially viable coatings, creep from scribe of 2 mm or less is desired.

Pencil Hardness Test

The hardness of cured coatings prepared from the composition is tested using the pencil hardness method, as described in ASTM D3363 (Standard Test Method for Film Hardness by Pencil Test). Pencils of varying hardness, from 6 B (softest) to 6H (hardest) are used. Results are reported in terms of the hardest pencil that does not scratch or mar the surface. Thus, for example, if a coating does not rupture with a 2H pencil, but ruptures when tested with a 3H pencil, the coating is reported to have a pencil hardness of 2H.

Weathering Test

The weatherability of the cured composition is determined by exposure to xenon arc light in a weatherometer (WOM), as described in ASTM G155 (Standard Practice for Operating Xenon Arc Light Apparatus for Exposure of Non-metallic Materials). Coating compositions are applied to aluminum test panels and cured fully. The panels are then exposed in the test chamber for 2000 hours. The 20-degree gloss retention is measured periodically throughout the testing, as described in ASTM D523-14 (Standard Method for Specular Gloss). Weatherability is reported as the percentage of 20-degree gloss retained after a given time period of exposure.

Example 1

Preparation of Primer Compositions

In order to determine the effect of MA acceptors and MA donors on cure response and corrosion resistance, catalyzed primer formulations 1 and 2 were prepared with resin components as indicated in Table 1. The amounts shown are weight percentages based on the total weight of the resin components in each formulation. In addition to the resin components listed in Table 1, primer formulations 1 and 2 include equivalent amounts of pigments, solvents, adhesion promoters, anti-settling agents, tints, dispersants, defoamers, and/or other additives conventionally used in commercial paint formulations. The formulations were made using traditional paint making equipment such as mills or high-speed mixing equipment.

TABLE 1

Catalyzed Primer Resin Composition

Resin components (wt. % of resin composition)

| Sample | Acrylated BPA epoxy | Acetoacetoxy functional epoxy | Malonate functional polyester (ACURE 510-170)* | Di-TMPTA |
|---|---|---|---|---|
| 1 - Control | 0 | 0 | 64 | 36 |
| 2 - Experimental | 33 | 67 | 0 | 0 |

*Allnex (Louisville, Kentucky)

Example 2

Cure Performance and Corrosion Resistance

To test for cure performance and corrosion resistance, the catalyzed primer formulations of Example 1 were spray-applied to iron phosphate-treated metal test panels (ACT B1000 P99X) at a dry film thickness (DFT) of about 1.5 to 2.0 mil (38.1 to 50.0 μm). The test panels were then placed in an oven for 10 minutes at a temperature of about 150° F. (65.5° C.). After the initial 10 minute cure, each panel was removed from the oven and tested for pencil hardness. Each panel was cured for an additional 20 minutes at 150° F. (65.5° C.) and then allowed to post-cure at room temperature of 68 to 77° F. (20 to 25° C. approximately). Each panel was then evaluated for corrosion resistance following up to 504 hours of salt spray exposure. Results are shown in Table 2, where "pass" for cure response denotes a pencil hardness of at least H after 10 minute cure at 150° F. (65.5° C.) and "pass" for salt-spray denotes a minimum ASTM rating of 10 for blistering, 9 for rust and less than 2 mm of average creep from scribe after scraping with a metal spatula.

TABLE 2

Cure Performance and Corrosion Resistance

| Sample | Cure Response (with pencil hardness) | Salt-Spray Results |
|---|---|---|
| 1 - Control | Pass (minimum H pencil) | Fail, 336 hrs, 6 MD blistering; 5-10 mm average creep from scribe |
| 2 - Experimental | Pass (minimum H pencil) | Pass, 504 hrs, 10 blister, 10 rust, <2 mm average creep from scribe |

Example 3

Effect of Epoxy Acrylate on Intercoat Adhesion

Michael addition catalyzed topcoat formulations A through E were prepared, each including about 2.8 percent by weight of epoxy acrylate, based on the total weight of resin components. In addition to the epoxy-acrylate component, each topcoat A-E includes different levels of kinetic modifiers, dispersants, and other conventional additives found in topcoat compositions.

To test the impact of adding epoxy acrylate to the topcoat formulation, each topcoat formulation was applied over the catalyzed primer Experimental Composition 2 of Example 1 already spray-applied to iron phosphate-treated metal test panels (ACT B1000 P99X) and cured for 30 minutes at 150° F. (65.6° C.). The test panels were then assessed for intercoat adhesion (i.e. adhesion between primer and topcoat). Each topcoat formulation showed significant improvement in intercoat adhesion relative to the same topcoat formulations without the epoxy acrylate component.

Example 5

Effect of Epoxy Acrylate on Weathering

Figure 1:
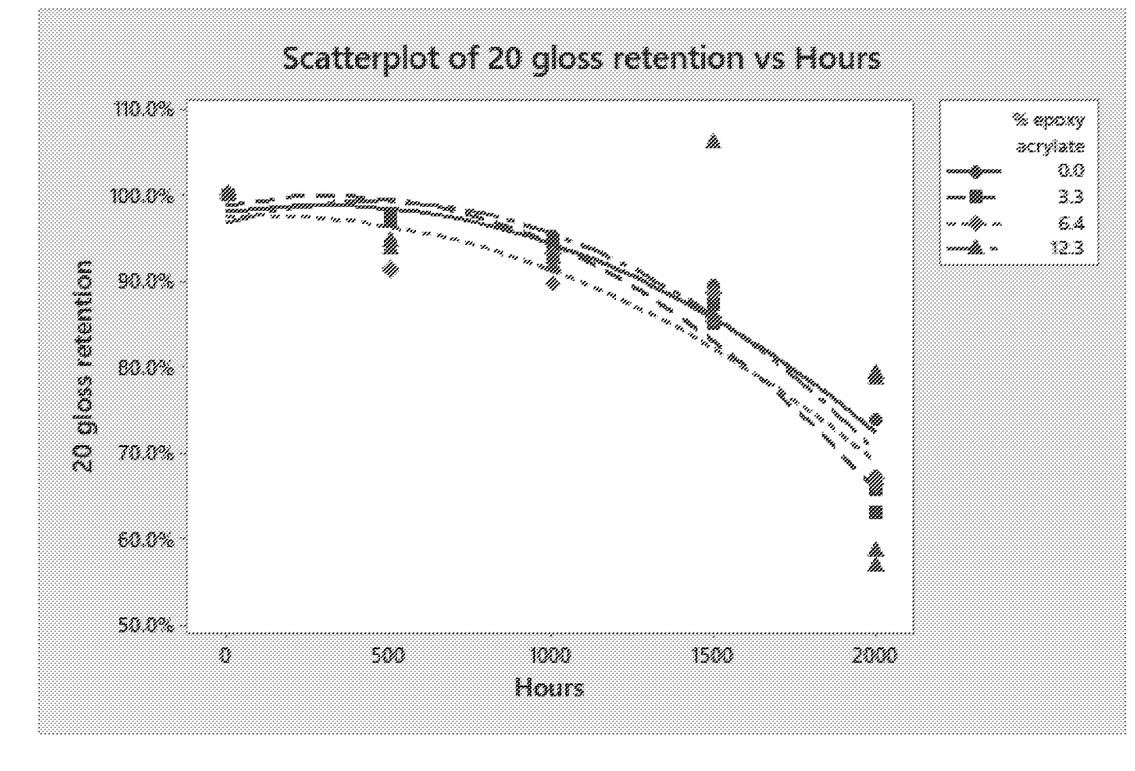
FIG. 1 is a graphical representation of the effect of different levels of epoxy acrylate on the weathering performance of the topcoat compositions described herein.

To test the effect of epoxy acrylate on the weathering performance of the topcoat, various catalyzed topcoat formulations were prepared, with each topcoat formulation F through I including different levels of epoxy acrylate. Each topcoat formulation was applied over the catalyzed primer Experimental Composition 2 of Example 1 already spray-applied to iron phosphate-treated metal test panels (ACT B1000 P99X) and cured for 30 minutes at 150° F. (65.5° C.). The test panels were then assessed for weathering performance by measuring 20-degree gloss at 500, 1000, 1500, and 2000 hours of exposure in a weatherometer, where the test samples are exposed to xenon arc light to simulate the effect of three years of heat, moisture, and sunlight. Results are represented as percentage retention of 20-degree gloss after a given period of exposure, and shown in FIG. 1.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A primer coating composition for application directly to a metal substrate, the primer coating composition comprising:
   a resin composition, at least a portion of which includes an epoxy backbone, the resin composition comprising:
   at least one Michael addition acceptor (MA acceptor) selected from esters of (meth)acrylic acid; and
   at least one Michael addition donor (MA donor) selected from dialkyl malonates, cyanoacetates, chloroacetates, acetoacetates, propionyl acetates, malononitrile, acetonitrile, acetylacetone, dipropionyl methane, or mixtures or combinations thereof;
   a latent catalyst;
   wherein both the MA acceptor and the MA donor provide the epoxy backbone portion of the resin composition,
   wherein the primer coating composition is capable of cure to the metal substrate in about 1 to 10 minutes at 150° F. or the primer coating composition is cured to the metal substrate in about 12 hours or less at ambient temperature, and wherein a cured coating directly applied to the metal substrate and formed from the primer coating composition is corrosion-resistant; and wherein the resin composition includes at least a portion having an aromatic epoxy backbone, and wherein the MA acceptor, the MA donor, or a combination of the MA acceptor and MA donor provide the aromatic epoxy backing portion of the resin composition.

2. The composition of claim 1, wherein the epoxy backbone portion of the MA acceptor is an aromatic epoxy backbone portion.

3. The composition of claim 2, wherein the aromatic epoxy backbone portion of the MA acceptor is derived from bisphenol-A, bisphenol-F, epoxy novolac, epoxy cresol, or mixtures thereof.

4. The composition of claim 1, wherein the epoxy backbone portion of the MA donor is an aromatic epoxy backbone portion.

5. The composition of claim 4, wherein the aromatic epoxy backbone portion of the MA donor is derived from bisphenol-A, bisphenol-F, epoxy novolac, epoxy cresol, or mixtures thereof.

6. The composition of claim 1, wherein the MA acceptor and MA donor each independently has functionality of at least about 2.

7. The composition of claim 1, wherein the latent catalyst is a substituted carbonate salt having the structure of a compound of Formula (I):

Formula 1 wherein $X^+$ is a non-acidic cation; and R is H, unsubstituted C1-C10 alkyl, aryl, aralkyl, substituted C1-C10 alkyl, aryl, aralkyl, or combinations thereof.

8. The composition of claim 1, wherein the latent catalyst is included in an amount of 0.001 to 1.0 meq/gram, based on the weight of the resin solids.

9. The composition of claim 1, wherein the composition further includes non-latent catalyst.

10. The composition of claim 9, wherein the non-latent catalyst comprises a salt of a basic anion X from an acidic X-H group containing compound, wherein X is N, P, O, S or C, and wherein the non-latent catalyst is present in an amount between 0.001 and 1 meq/g, based on the weight of the resin solids.

11. The composition of claim 1, further including a potlife or open-time extending component having one or more acidic X'—H group-containing compounds, wherein X' is N, P, O, S, or C, and wherein the potlife or open-time extending component is present in an amount of about 0.5% and 1.5%, based on the weight of the resin solids.

12. The composition of claim 1, further including an adhesion promoter component.

13. The composition of claim 12, wherein the adhesion promoter component is selected from an organosilane, a zircoaluminate, or combinations thereof.

14. The composition of claim 1, further including an acid scavenging component selected from metal oxide, metal hydroxide, metal nitride, metal oxynitride, metal carbonate, metal silicate, metal carboxylate salts, organic metal compounds, mesoporous metal, amines, imides, diaza-bicyclo compounds, or combinations thereof.

15. The composition of claim 1, wherein the metal substrate is a pretreated metal substrate.

16. The primer coating composition of claim 1, wherein the MA acceptor is derived from bisphenol-A, bisphenol-F, epoxy novolac, epoxy cresol, or mixtures thereof and the MA donor is derived from bisphenol-A, bisphenol-F, epoxy novolac, epoxy cresol, or mixtures thereof.

17. The primer coating composition of claim 16, wherein the MA donor is about 10 to about 40 weight percent of the coating composition and the MA acceptor is about 10 to about 40 weight percent of the coating composition.

18. The primer coating composition of claim 17, wherein a stoichiometric index of the MA donor acidic protons to the MA acceptor unsaturated groups is 1.5:1 to 0.7:1.

19. The primer coating composition of claim 1, wherein the MA acceptor is an acrylated diglycidyl ether of bisphenol A and the MA donor is an acetoacetoxy functionalized epoxy.

20. A method of making a corrosion-resistant primer coated substrate, the method comprising:
providing a metal substrate;
applying directly on the metal substrate a first coating composition, the first coating composition including a resin composition, at least a portion of which includes an epoxy backbone, the resin composition including at least one Michael addition acceptor (MA acceptor) selected from esters of (meth)acrylic acid; at least one Michael addition donor (MA donor) selected from dialkyl malonates, cyanoacetates, chloroacetates, acetoacetates, propionyl acetates, malononitrile, acetonitrile, acetylacetone, dipropionyl methane, or mixtures or combinations thereof, and a latent catalyst, wherein both the MA acceptor and the MA donor provide the epoxy backbone of the resin composition, wherein the resin composition includes at least a portion having an aromatic epoxy backbone, and wherein the MA acceptor, the MA donor, or a combination of the MA acceptor and MA donor provide the aromatic epoxy backing portion of the resin composition, and wherein the first coating composition is capable of cure in about 1 to 10 minutes at 150° F., and wherein a cured coating formed from the first coating composition applied directly to the metal substrate is corrosion-resistant.

21. The method of claim 20, further comprising applying a second coating composition over the first coating composition.

22. The method of claim 21, wherein the second coating composition is applied over the first coating composition before the first coating composition is dried or cured.

23. The method of claim 22, wherein the second coating composition is a Michael addition reactive coating composition.

24. The method of claim 23, wherein the second coating composition is a polyurethane.

25. The method of claim 20, wherein the MA acceptor is an acrylated diglycidyl ether of bisphenol A and the MA donor is an acetoacetoxy functionalized epoxy.

26. The method of claim 25, wherein the MA donor is about 10 to about 40 weight percent of the coating composition and the MA acceptor is about 10 to about 40 weight percent of the coating composition.

27. The method of claim 26, wherein a stoichiometric index of the MA donor acidic protons to the MA acceptor unsaturated groups is 1.5:1 to 0.7:1.

* * * * *